United States Patent
Kerbiriou et al.

(10) Patent No.: US 8,160,159 B2
(45) Date of Patent: Apr. 17, 2012

(54) METHOD AND DEVICE FOR CODING A MOSAIC

(75) Inventors: Paul Kerbiriou, Thorigne Fouillard (FR); Dominique Thoreau, Cesson Sevigne (FR); Gwenael Kervella, Rennes (FR); Edouard Francois, Bourg des Comptes (FR)

(73) Assignee: Thomson Licensing (FR)

( * ) Notice: Subject to any disclaimer, the term of this patent is extended or adjusted under 35 U.S.C. 154(b) by 1331 days.

(21) Appl. No.: 10/485,027

(22) PCT Filed: Jul. 24, 2002

(86) PCT No.: PCT/FR02/02639
§ 371 (c)(1),
(2), (4) Date: Jan. 27, 2004

(87) PCT Pub. No.: WO03/013145
PCT Pub. Date: Feb. 13, 2003

(65) Prior Publication Data
US 2004/0184548 A1 Sep. 23, 2004

(30) Foreign Application Priority Data
Jul. 27, 2001 (FR) ...................................... 01 10087

(51) Int. Cl.
*H04N 7/12* (2006.01)
*H04N 11/02* (2006.01)
*H04N 11/04* (2006.01)

(52) U.S. Cl. .......... 375/240.28; 375/240.08; 375/240.11

(58) Field of Classification Search .............. 375/240.28
See application file for complete search history.

(56) References Cited

U.S. PATENT DOCUMENTS

| | | | | |
|---|---|---|---|---|
| 5,361,096 | A | 11/1994 | Ohki et al. | 348/387 |
| 5,473,379 | A * | 12/1995 | Horne | 375/240.16 |
| 5,999,662 | A * | 12/1999 | Burt et al. | 382/284 |
| 6,075,567 | A | 6/2000 | Ohnishi | 348/383 |
| 6,181,824 | B1 * | 1/2001 | Takizawa et al. | 382/233 |

(Continued)

FOREIGN PATENT DOCUMENTS

FR 2786353 5/2000

(Continued)

OTHER PUBLICATIONS

ISO/IEC JTC 1/SC 29/WG 11 N 2052, "Information Technology—Generic coding of audio-visual objects", Oct. 1998, pp. 371-373.*

(Continued)

*Primary Examiner* — Christopher S Kelley
*Assistant Examiner* — Chikaodili E Anyikire
(74) *Attorney, Agent, or Firm* — Jack Schwartz & Associates, PLLC

(57) ABSTRACT

The process for coding a mosaic of images giving a stream of coded data the mosaic being composed of subimages, the subimages being composed of image elements, resynchronization markers in the stream allowing resynchronization of the data at reception level, wherein the subimages are placed under one another in the image to be coded so as to give a mosaic, the mosaic is coded element by element according to a TV-type scan so as to provide data of the stream, the first element of each subimage being identified, and a resynchronization marker is placed in the stream, before each first element of a subimage, so as to identify the data relating to the subimage.

15 Claims, 3 Drawing Sheets

U.S. PATENT DOCUMENTS 6,259,828 B1 * 7/2001 Crinon et al. .................. 382/305
6,310,897 B1 * 10/2001 Watanabe et al. .............. 370/522
6,404,817 B1 * 6/2002 Saha et al. ............... 375/240.27

FOREIGN PATENT DOCUMENTS

| | | |
|---|---|---|
| JP | 10040357 | 2/1998 |
| WO | 97/36425 | 10/1997 |
| WO | 00/40022 | 7/2000 |

OTHER PUBLICATIONS

Mon-Song Chen et al., *"Multiparty talks"*, Image Processing, European Technology Publishing, London, Gr.Britain, vol. 5, No. 3, 1993, pp. 23-25, XP002101200.

Loui et al., *"Video Combining for Multipoint Videoconferencing"*, Proceedings of IS&T 48th Annual Conference, May 7, 1995, pp. 48-50, XP000791051.

* cited by examiner

METHOD AND DEVICE FOR CODING A MOSAIC

This application claims the benefit under 35 U.S.C. §365 of International Application PCT/FR02/02639 filed Jul. 24, 2002, which claims the benefit of French Patent Application No. 01/10087 filed Jul. 27, 2001.

FIELD OF THE INVENTION

The invention relates to a process and a device for coding and decoding a mosaic of images.

The field is that of video compression of MPEG type or the like, in the case where this technique makes it possible to implement resynchronization means. It entails for example the H263 or MPEG 4 standard or any compression process that offers the possibility of placing resynchronization markers at various places in the binary train generated during compression.

BACKGROUND OF THE INVENTION

In contemporary digital decoders implementing MPEG 2 decoders, the mosaic is generally composed of several pages (screens) each page corresponding to a channel (MPEG 2 elementary stream). At any instant, a complete image is decoded and displayed. Even if only a part of the mosaic is useful for display, the mosaic must be completely decoded, thus generating a considerable processing time.

SUMMARY OF THE INVENTION

The aim of the invention is to alleviate the aforesaid drawbacks.

Its subject is a process for coding a mosaic of images giving a stream of coded data the mosaic being composed of subimages, the subimages being composed of image elements, resynchronization markers in the stream allowing resynchronization of the data at reception level, characterized in that:
  the subimages are placed under one another in the image to be coded so as to give a mosaic,
  the mosaic is coded element by element according to a TV-type scan so as to provide data of the stream, the first element of each subimage being identified,
  a resynchronization marker is placed in the stream, before each first element of a subimage, so as to identify the data relating to the subimage.

According to a particular implementation of the process, an image element is a macroblock, the coding utilizes the MPEG 2 standard and the resynchronization markers are headers of slices (according to the terminology in the standard).

According to a particular implementation of the process, an image element is a macroblock, the coding utilizes the MPEG 4 standard and the resynchronization markers are headers of groups of macroblocks.

According to a particular implementation of the process, when the coding of the subimages is in inter mode with motion estimation, the motion estimation utilizes a window for searching for the motion vector which corresponds to the location of the subimage in the image.

According to a particular implementation of the process, the coding of a subimage is forced to intra mode if it has not been coded in this mode for a specified number of previous mosaic images.

According to a particular implementation of the process, the subimages having different sizes, the surface of these images constituting a mosaic support, the mosaic support is also coded and the support's coding data are transmitted in the stream at the start of a video session. If the support varies over time, the support's coding data are transmitted in the stream at each variation.

The invention also relates to a process for decoding a mosaic of images on the basis of a stream of data comprising resynchronization markers and data for coding mosaics of images consisting of subimages, characterized in that a filtering of these data on the basis of the resynchronization markers and a decoding are performed, to extract from the stream and to decode, from among the data relating to the mosaics, only the data relating to selected subimages.

According to a particular implementation of the process, the decoded subimages are stored and if a subimage has been coded in inter mode, the corresponding stored subimage of the previous mosaic is utilized for the decoding.

According to a particular implementation of the process, if a subimage may not be decoded, the corresponding subimage of the previous mosaic is taken into account.

The invention also relates to a decoder for the decoding of a mosaic of images on the basis of a stream of data comprising resynchronization markers and data for coding mosaics of images consisting of subimages, characterized in that it comprises a circuit for filtering on the basis of the synchronization markers and a decoding circuit for extracting from the stream and for decoding, from among the data relating to the mosaics, only the data relating to selected subimages.

The invention also relates to a reader of a video datastream transporting data for coding mosaics of images composed of subimages and resynchronization markers, for the displaying of a final image, comprising a decoder for the decoding of the stream and a processing circuit for the management of the decoder, characterized in that:
  the processing circuit sends the decoder information regarding the selected subimages useful for the displaying of the final image,
  the decoder comprises a circuit for filtering on the basis of the synchronization markers and a decoding circuit, for extracting from the stream and for decoding, from among the data relating to the mosaics, only the data relating to the selected subimages.

The idea of the invention is to utilize resynchronization markers generally provided for in the standards to allow resynchronization with a datastream received upon errors or losses of transmission, so as to define data, in the stream, belonging to various parts of images or subimages from which a mosaic image is composed. The technique of resynchronization markers is used to tag the start of each subimage of the mosaic and to decode at any instant only the parts of the mosaic to be displayed.

The decoding procedure is thus improved in terms of speed of calculation, the video decoding of the mosaic of images is accelerated. The aim is to maximally preserve the resources of the central processing unit (CPU) of the reader so as to allow it to perform tasks other than those of video decoding of the mosaic. The term "reader" used here designates the entire apparatus that comprises the video decoder and also the whole of the system layer that controls this decoder, as well as other elements such as audio decoder, graphics processing circuits, display circuits.

In the case of an MPEG 4 reader the share devoted to the management of graphics applications and to the system layer is essential. More and more platforms are equipped with means for decoding MPEG 4 data and it is becoming logical for interactive applications of the electronic program guide or EPG type to be implemented in the MPEG 4 standard, allowing greater richness at the interactivity level. It is therefore beneficial to render the video decoding as fast as possible and to simplify the processing of the data in applications of this type.

This selective decoding is implemented on the basis of a proprietary method at the level of the decoder and on the basis of information originating from the "system" layer that controls the video decoder. The "standard" decoders not having this improvement nevertheless remain compatible with the technique implemented, although without benefiting from the advantages of the process proposed.

BRIEF DESCRIPTION OF THE DRAWINGS

Other features and advantages of the invention will become clearly apparent in the following description given by way of nonlimiting example and while referring to the appended figures which represent.

DETAILED DESCRIPTION OF THE DRAWINGS

The proposed process intervenes in three elements of the video coding/decoding chain: the video coder, the system layer of the reader containing the video decoder, the video decoder. It utilizes, during encoding, the technique of video packets, existing for example in the video MPEG 4 standard (cf. ISO/IEC JTC 1/SC 29/WG 11 N 2502, annex E, paragraph E.1.1, pages 307 to 308). It consists in placing, in each image, resynchronization markers delimiting each video packet, these packets being coded independently of one another, as described in this document in paragraph E.1.1 entitled "resynchronization".

Figure 1:
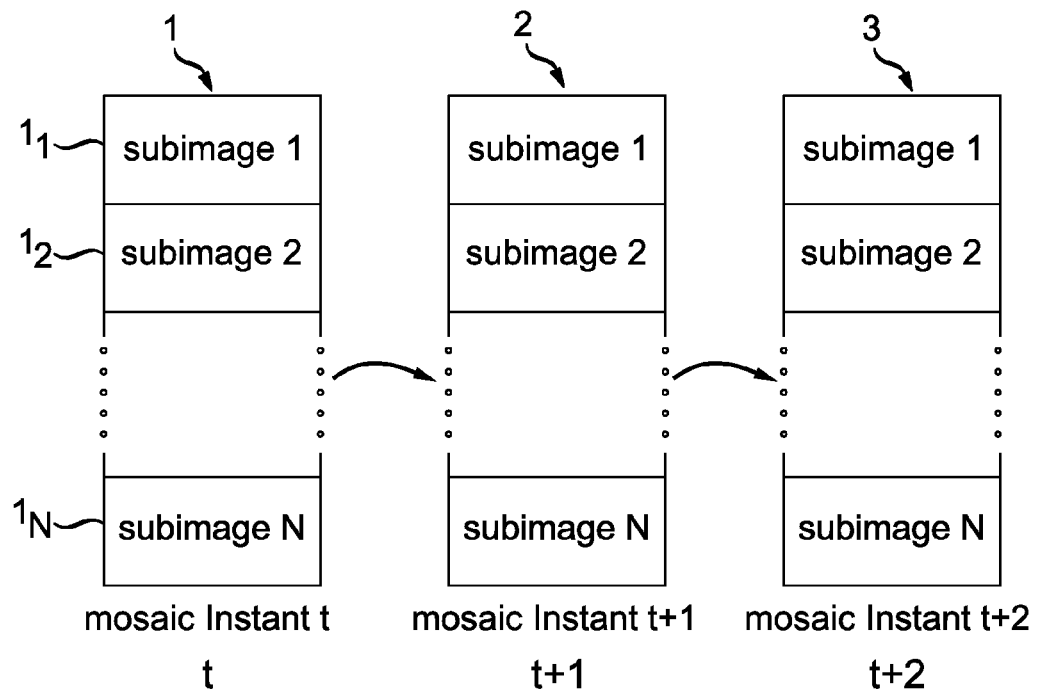
FIG. 1, a format of mosaic to be coded,
FIG. 2, a binary train generated by the coder,
FIG. 3, a processing algorithm of the decoder,
FIG. 4, a format of mosaic of variable size.

FIG. 1 represents a succession of three "mosaic" images referenced 1, 2, 3 to be coded at the instants t, t+1, t+2. In this example, a mosaic image consists of subimages or imagettes of identical size and the corresponding video therefore consists of the superposition of subimages of identical size. Thus, the mosaic image 1 consists of N subimages or imagettes referenced $1_1$ to $1_N$.

Figure 2:
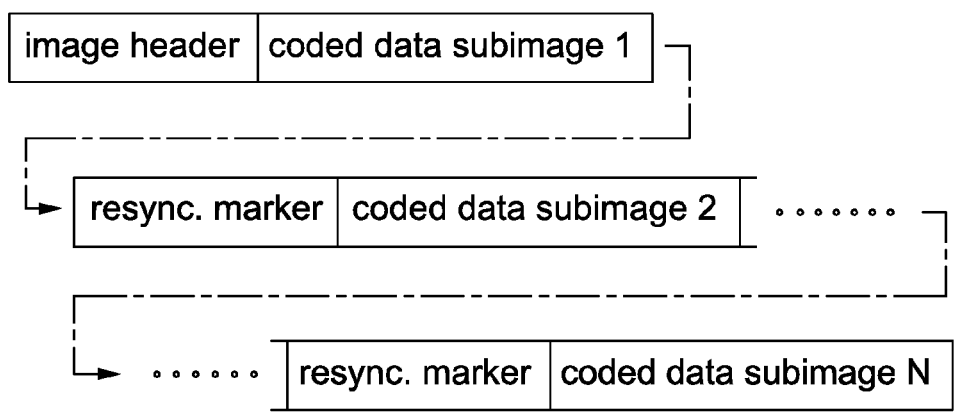

The binary coding stream for these images is represented in FIG. 2. It is a binary train of the elementary stream (to use the terminology in the MPEG standard), corresponding to the entire mosaic. The video data relating to the mosaic image are preceded by an image header. They consist of the coded data relating to each subimage. According to the invention, these data are separated for each subimage by a resynchronization marker. During encoding, the coder places, in the binary train, resynchronization markers delimiting the video packets, these packets being coded independently of one another, a video packet therefore corresponding to the data between two markers. Each subimage is then processed as a video packet and a resynchronization marker is therefore placed at the start of each subimage, that is to say it precedes, in the datastream, the video data corresponding to a subimage. In the case of macroblock coding, this marker is placed, in the datastream, before the first macroblock of each subimage.

The video coder codes all the video subimages. By placing, for the coding of the mosaic, the subimages one after another, their coding, by the video coding layer, is effected in a sequential manner, one after another when considering the conventional television type mode of scanning. Thus, by incrementing the synchronization markers from one subimage to the next, it is possible, when decoding, to tag and to access the desired subimage or subimages directly on the basis simply of the index number of the associated marker. On the basis of the information originating from the system layer indicating the desired subimages, that is to say necessary for the production of the final image to be displayed, the decoder can therefore initiate the decoding of just these subimages useful for this final image.

The coding of the subimages can utilize the motion estimation for a coding of inter, predictive or bidirectional type. In order for the subimages to be decodable independently of one another, it is necessary, when coding a subimage of inter type, for the motion estimation zone to be limited to a prediction zone corresponding to the location and the size of the subimage concerned. Thus, a motion vector of the motion estimator is not permitted to point to a subimage other than the one corresponding to the block with which it is associated. This limitation can be applied on the vertical axis alone, the standard permitting a motion vector to point outside the image for the horizontal axis.

To allow the decoder to access the subimages of the mosaic in a random manner, for example, subsequent to an action by the user, the subimages must be regularly coded in intra mode.

Several solutions are possible:
the coder codes at a relatively high frequency, conventionally every 0.5 seconds, the complete mosaic in intra mode.
if the coding syntax so permits, the coding in intra mode is not performed on the whole of the image but only on a part of the image. Thus the coder uses this intra mode subimage by subimage in a rotating manner. At a given instant, only the first subimages are forced to intra mode. The other subimages are coded in predictive mode, hence with temporal prediction. At the following instant, the subsequent subimages are the ones that are coded in intra mode, and so on and so forth until the last subimages of the mosaic are reached. The procedure then recommences for the first subimages. This allows a time dilution of the cost, in terms of bit rate, of the intra-coded subimages and makes it possible to avoid any bit rate spike that might occur if the coding of the complete image were performed in intra mode.

An implementation much like this second solution consists in furnishing each of the subimages with an intra refresh counter, reinitialized at each intra coding, for example to a value equal to the refresh period Rf, this counter being decremented at each inter coding of the subimage in question. At the start of the coding of the mosaic sequence, once the first mosaic image has been coded in intra mode, the counters associated with the subimages are initialized randomly between 0 and Rf. The intra coding of the subimage is triggered each time the counter returns to Rf. Moreover, during a change of scene (cut) relating to a subimage, the refresh counter associated with this subimage may be reinitialized to Rf so as to allow the coding of this subimage in intra mode.

The system layer of the reader implements a proprietary solution making it possible to indicate to the video decoder, from a suitable interface, which subimages of the mosaic have to be decoded. It sends for example the ordered list of index numbers of the subimages to be decoded. These subimages are exactly those which have to be displayed after decoding. When a "standard" decoder is used, this information will not be utilized and the entire mosaic will then be decoded.

The video decoder receives the binary stream corresponding to the coded mosaic, as well as the list of index numbers of the subimages to be decoded. It manages the following information:
the mode of coding of the current image (intra or predictive mode);
an indicator assigned to each imagette, signalling whether the imagette has been decoded at the previous instant (subimage_decoded (k)).

The "subimage_decoded (k)" indicator for k varying from 1 to N, indicator relating to subimage (k), N being the number of subimages constituting the mosaic, makes it possible to ascertain whether this subimage k has been completely decoded at the previous instant and hence reconstructed. Such is the case when this subimage k is coded in intra mode or when it is coded in predictive mode (inter mode) and when therefore the corresponding previous subimage to which the motion vectors refer is decoded, allowing the decoding of this current subimage k.

Figure 3:
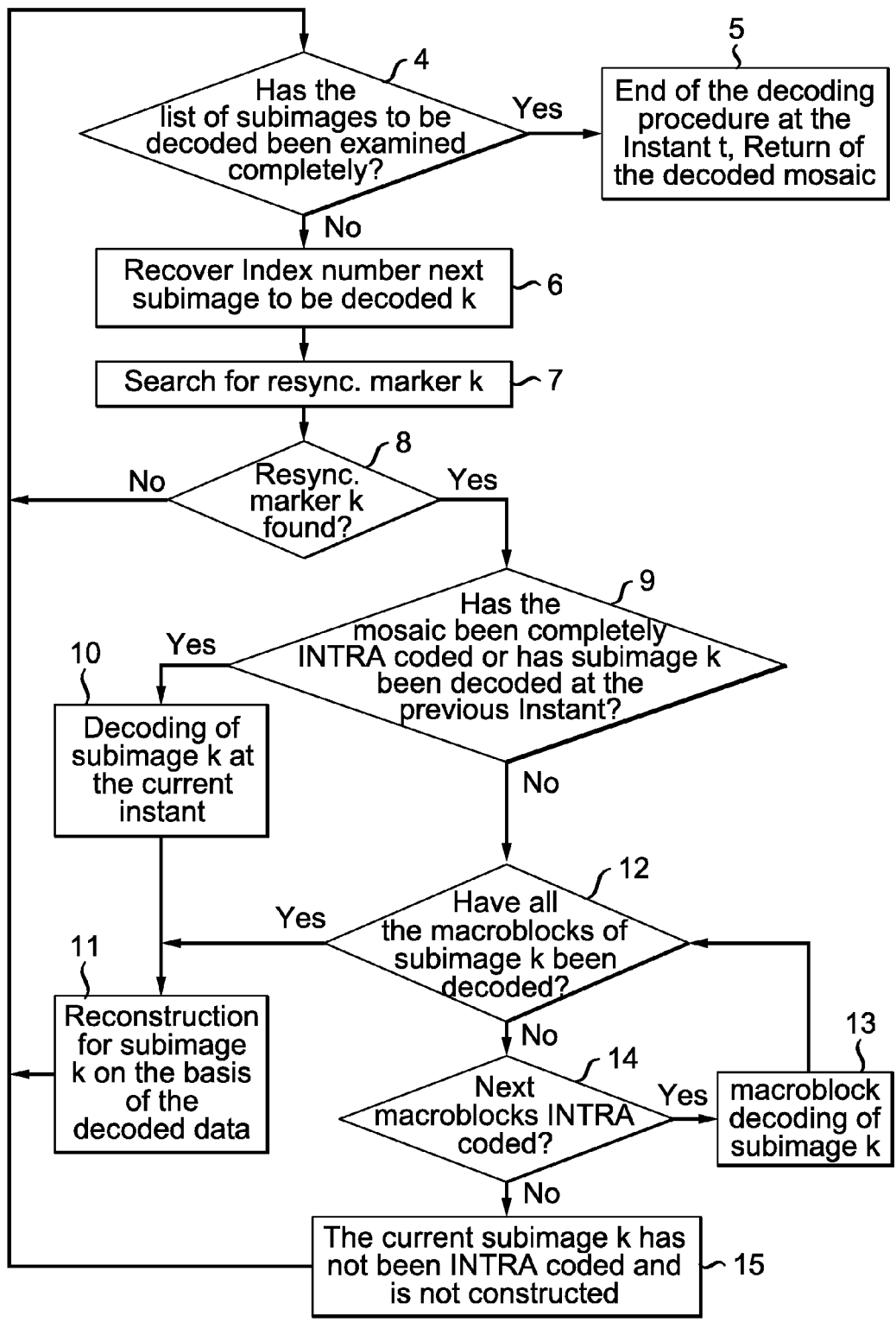

The processing algorithm of the reader is represented in FIG. 3. The list, calculated by the system layer, of subimages to be decoded is utilized by the processing algorithm.

A first step 4 checks whether all the subimages of the list have been processed.

If so, that is to say if we are at the end of the list, the next step is step 5. All the subimages necessary for the display of the final image having been processed, the decoding procedure is terminated and the decoded mosaic is returned to the system layer which will process it so as to carry out the display of the final image.

If not, the next step 6 recovers the index number k of the next subimage to be processed, the first subimage if we are at the start of an iteration. The next step 7 searches for the resynchronization marker k in the datastream. Step 8 checks whether it has been found.

If it has not, for example if there was an error in the transmission of the data, we loop back to step 4 to process the next subimage, the indicator relating to the current subimage k being positioned in such a way as to signal that the subimage could not be decoded.

If it has, the next step, which is step 9, checks whether the mosaic has been coded completely in intra mode, or else whether subimage k of the previous mosaic image has actually been decoded. This check can be made on the basis of the positioning of the "subimage_decoded(k)" indicators assigned to the subimages:
 if such is the case, the decoding of the subimage is then possible and then, during step 10, the data relating to this subimage k are decoded.
 if such is not the case, the algorithm will check whether the coding of the macroblocks of subimage k is performed in intra mode, the mode of coding of the overall image being the inter mode, however.

Thus, a step 12 checks whether all the macroblocks of the subimage have been investigated.

If they have not, step 14 checks, for the next macroblock, whether it is coded in intra mode:
 if such is not the case, subimage k may not be decoded in intra mode, and step 15 positions the indicator in such a way as to signal that the corresponding imagette has not been decoded. The next step is step 4 which processes the next subimage.
 if such is the case, the next step 13 performs the decoding of the data relating to this macroblock and then step 12 checks whether this is the last macroblock to be coded of this subimage k.

If they have, that is to say, if all the data relating to the macroblocks of subimage k were able to be decoded, step 11 is implemented.

When the data relating to all the macroblocks of the subimage have been decoded, whether this be on completion of step 13 and 12 or else on completion of step 10, the subimage is then reconstructed during the next step 11 where the "subimage_decoded(k)" indicator is updated. This involves a reconstruction, either on the basis solely of the data of the stream relating to this subimage at the instant t if the coding of the data was in intra mode, or on the basis of the stored data of the corresponding decoded subimage of the previous mosaic if the coding of the data was in inter mode. The imagette is constructed on the basis of the decoded data by performing in a conventional manner the operations of inverse cosine transformation, motion compensation, addition of the residual in inter mode, etc.

We then go to a new subimage, step 4, during a new iteration.

This algorithm therefore makes it possible to construct just the imagettes whose index number is indicated in the list of imagettes to be decoded, on the condition that they are coded in intra mode or coded in predictive mode, the corresponding previous imagette having been constructed itself. If in this predictive mode, the corresponding imagette of the previous mosaic has not been reconstructed, it is necessary to wait for a subsequent imagette coded in intra mode in order to be able to construct it. It is therefore essential, during coding, to regularly code the imagettes in intra mode. It is the loop 12, 14, 13 that makes it possible to check the coding in intra mode of a subimage when the overall image is coded in predictive mode. On exit from this decoding procedure one obtains a mosaic that is partially filled as a function of the necessary imagettes.

When a subimage could not be constructed (step 15), one solution consists in utilizing the corresponding subimage of the previous mosaic.

An improvement of the invention consists in transmitting imagettes of different size. The process then consists, at the coder level, in coding, in addition to the image of the mosaic, the form of the support of the mosaic.

Figure 4:
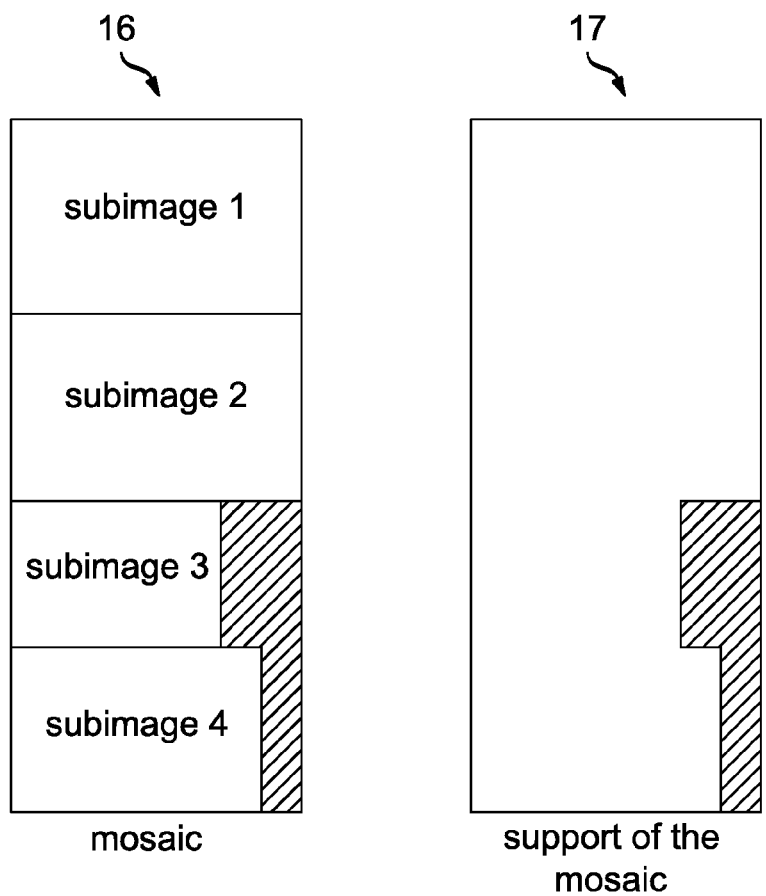

FIG. 4 represents, referenced 16, a form of mosaic for which the imagettes do not all have the same form. In this case, a coding of the mosaic's support, referenced 17 in the figure, is performed. This coding is necessary only at the very start of the video session. However, a modification over time of the arrangement of the various imagettes is possible. It is then necessary to update this support. The new support is transmitted, in intra or inter mode, at each change of arrangement of the imagettes that gives rise to a change of support.

An implementation of the process utilizes the macroblock coding of a subimage. This is an exemplary embodiment and the macroblock can be replaced by any image element without thereby departing from the field of the invention.

The process described can be extended to video objects of any form, the support then having to be coded at each instant. One application relates to video games where the imagettes correspond to various cartoon-like characters.

It may be noted that if, at the encoding level, the addition of resynchronization markers at the start of each subimage slightly encumbers the binary stream, this escalation is limited and moreover yields a resynchronization tool that facilitates the masking of transmission errors.

The selecting of the subimages on the basis of the synchronization markers can be done by assigning an index numbering to the markers and to the subimages, an index number of a marker then corresponding to a specified subimage. It can also be done by taking account of the sequential coding of the subimages, the nth synchronization marker for the data relating to a mosaic image then corresponding to the nth coded subimage of the mosaic.

Applications relate, among others, to interactive services using the video mosaic system. It may, for example, entail the consultation of an electronic program guide where the user has the possibility of examining the various pages of a mosaic of programs.

The invention claimed is:

1. Process for coding a mosaic of images of a sequence of images giving a stream of data coded according to a syntax allowing for an integration of markers, for resynchronization so as to synchronize the stream on reception, the mosaic being composed of sub-images, the sub-images being composed of image elements constituting any number of scan lines, comprising the steps of:
   coding a sub-image according to a TV type scan, image element by image element, wherein at least one of the sub-images is composed of image elements arranged in at least two scan lines of image elements, the sub-images being coded sequentially one sub-image after the other, so as to provide successively, as bitstream data, data of the sub-images, wherein the coding of a sub-image is forced to an intra mode if it has not been coded in this mode for a specified number of previous mosaic images,
   placing a resynchronization marker in the bitstream, before data relating to each first image element of said sub-image, so as to identify data relating to the sub-image, a single resynchronization marker being placed in the bitstream for said at least one of the sub-images.

2. Process according to claim 1, wherein an image element is a macroblock, wherein the coding utilizes the MPEG 2 standard and wherein the resynchronization markers are headers of slices.

3. Process according to claim 1, wherein an image element is a macroblock, wherein the coding utilizes the MPEG 4 standard and wherein the resynchronization markers are headers of groups of macroblocks.

4. Process for coding according to claim 1, wherein, when the coding of the sub-images is an inter mode with motion estimation, the motion estimation utilizes a window for searching for the motion vector which corresponds to the location of the sub-image in the image.

5. Process according to claim 1, with the sub-images having different sizes, a surface of these sub-images constituting a mosaic support, wherein the mosaic support is also coded and support-coding data transmitted in the stream at a start of a video session.

6. Process according to claim 5, wherein the mosaic support varies over time and wherein the support-coding data are transmitted in the stream at each variation.

7. Process for decoding a mosaic of images on the basis of a stream of data comprising resynchronization markers and coded data of mosaics of images comprising sub-images, the sub-images being composed of image elements constituting any number of scan lines for the display of at least one selected sub-image, a resynchronization marker being placed, in the stream, before data relating to each first element of a sub-image, image elements of each sub-image being consecutive within the bitstream, comprising the steps of:
   filtering said data on the basis of the resynchronization markers to extract from the data related to the mosaics of images, only data relating to at least one selected sub-image, wherein at least one of the sub-images is composed of image elements arranged in at least two scan lines of image elements, a single resynchronization marker being within the bitstream for at least one of the sub-images, and decoding the filtered data and wherein the filtered data is decoded in intra mode if it has not been decoded in this mode for a specified number of previous mosaic images.

8. Process according to claim 7, wherein numbers are allocated to the resynchronization markers and wherein the filtering is dependent on the numbers of the resynchronization markers.

9. Process for decoding according to claim 7, wherein the decoded sub-images are stored, and wherein, if a sub-image has been coded in inter mode, the corresponding stored sub-image of the previous mosaic is utilized for the decoding.

10. Process according to claim 7, wherein, if a sub-image can't be decoded, it is replaced by the corresponding sub-image of the previous mosaic.

11. A decoder for the decoding of a mosaic of images on the basis of a stream of data comprising resynchronization markers and coded data of mosaics of images consisting of sub-images, the sub-images being composed of image elements constituting any number of scan lines, for the display of at least one selected sub-image, a resynchronization marker being placed, in the stream, before data relating to each first element of a sub-image, image elements of each sub-image being consecutive within the bitstream, comprising a circuit for filtering on the basis of the synchronization markers, from among the data relating to the mosaics, only the data relating to at least one selected sub-image, wherein at least one of the sub-images is composed of image elements arranged in at least two scan lines of image elements, a single resynchronization marker being within the bitstream for said at least one sub-images, and a decoding circuit for decoding the filtered data and wherein the filtered data is decoded in intra mode if it has not been decoded in this mode for a specified number of previous mosaic images.

12. Reader of a video datastream transporting data for coding mosaic of images composed of sub-images and resynchronization markers, the sub-images being composed of image elements constituting any number of scan lines, a resynchronization marker being placed, in the stream, before each first element of a sub-image, image elements of each sub-image being consecutive within the bitstream, for the displaying of a final image made up of at least one selected sub-image, comprising a decoder for the decoding of the stream and a processing circuit for the management of the decoder wherein:
   the processing circuit comprises means for determining sub-images to be selected for the display of the final image, and the decoder comprises a circuit for filtering on the basis of the synchronization markers, from among the data relating to the mosaics, only data relating to the selected sub-images, wherein at least one of the sub-images is composed of image elements arranged in at least two scan lines of image elements, a single resynchronization marker within the bitstream for said at least one of the sub-images, and a decoding circuit for decoding the filtered data and wherein the filtered data is decoded in intra mode if it has not been decoded in this mode for a specified number of previous mosaic images.

13. Process according to claim 7, wherein an image element is a macroblock, the coding utilizes the MPEG 2 standard and the resynchronization markers are headers of slices.

14. Process according to claim 7, wherein an image element is a macroblock, the coding utilizes the MPEG 4 standard and the resynchronization markers are headers of groups of macroblocks.

15. Process according to claim 1, wherein the coding of the sub-images, one sub-image after the other, comprises the step of:
   superimposing the sub-images one on top of another,
   coding successively the sub-images according to a TV-type scan.

* * * * *